US006405683B1

(12) United States Patent
Walter et al.

(10) Patent No.: US 6,405,683 B1
(45) Date of Patent: Jun. 18, 2002

(54) RETRACTABLE LEASH ASSEMBLY

(75) Inventors: Glen Walter, Boxford; Benjamin Beck, Boston; David Harting, Needham; Douglas Marsden, Lynnfield, all of MA (US)

(73) Assignee: Eleven, LLC, Boston, MA (US)

(*) Notice: Subject to any disclaimer, the term of this patent is extended or adjusted under 35 U.S.C. 154(b) by 0 days.

(21) Appl. No.: 09/382,033

(22) Filed: Aug. 24, 1999

(51) Int. Cl.[7] ............................................. A01K 27/00
(52) U.S. Cl. ........................................................ 119/772
(58) Field of Search ................................ 119/772, 775, 119/776, 792, 793, 794, 795–798

(56) References Cited

U.S. PATENT DOCUMENTS

| | | |
|---|---|---|
| 341,682 A | 5/1886 | Peard et al. |
| 2,217,323 A | 10/1940 | Sackett |
| 2,222,409 A | 11/1940 | Gottlieb |
| 2,250,171 A | 7/1941 | Wilkins |
| 2,314,504 A | 5/1943 | Lifchultz |
| 2,919,676 A | 1/1960 | Schneider |
| 2,976,959 A | 3/1961 | Husted |
| 3,233,591 A | 2/1966 | Rogers et al. |
| 3,250,253 A | 5/1966 | Galin |
| 3,318,288 A | 5/1967 | Mullritter |
| 3,477,410 A | 11/1969 | Lettieri |
| 3,578,260 A | 5/1971 | Kell ........................ 242/107.4 |
| 3,635,419 A | 1/1972 | Pringle .................... 242/107.4 |
| 3,693,593 A | 9/1972 | Croce et al. ................ 119/109 |
| 3,853,283 A | 12/1974 | Croce et al. ............. 242/107.4 |
| 3,935,443 A | 1/1976 | Simmons .................... 240/6.4 |
| 3,937,418 A | 2/1976 | Critelli .................... 242/107.4 |
| 3,964,441 A | 6/1976 | Wall ............................ 119/109 |
| 4,018,189 A | 4/1977 | Umphries et al. .......... 119/109 |
| 4,165,713 A | 8/1979 | Brawner et al. ............ 119/109 |
| 4,197,817 A | 4/1980 | Crutchfield ................. 119/109 |
| 4,202,510 A | 5/1980 | Stanish ..................... 242/107.4 |
| 4,269,150 A | 5/1981 | McCarthy ................... 119/109 |
| 4,501,230 A | 2/1985 | Talo ............................ 119/109 |
| 4,513,692 A | 4/1985 | Kuhnsman et al. ......... 119/109 |
| 4,748,937 A | 6/1988 | Musetti ....................... 119/109 |
| 4,796,566 A | 1/1989 | Daniels ....................... 119/124 |
| 4,875,145 A | 10/1989 | Roberts ....................... 362/103 |
| 4,887,551 A | 12/1989 | Musetti ....................... 119/109 |
| 4,887,552 A | 12/1989 | Hayden ....................... 119/109 |

(List continued on next page.)

FOREIGN PATENT DOCUMENTS

| | | |
|---|---|---|
| DE | 78 28 193 U | 4/1979 |
| DE | 91 08 524 U | 12/1991 |
| DE | 298 04615 U | 5/1998 |
| DE | 297 19369 U | 11/1998 |
| DE | 29 04882 U1 | 3/1999 |
| EP | 0464725 A1 | 1/1992 |
| FR | 2 251259 A | 6/1975 |

*Primary Examiner*—Thomas Price
(74) *Attorney, Agent, or Firm*—Lahive & Cockfield, LLP (57) ABSTRACT

A leash handle assembly having a housing with a grip portion, a spool assembly rotatably mounted in the housing, a trigger movably mounted to the grip portion, and a dual-position switch mounted to the housing proximate to the grip portion. The spool assembly is adapted for winding and unwinding a leash cord. The movable trigger is actuated to inhibit the leash cord from extending or retracting, and released to enable the leash cord to extend out of the housing in response to an external force. The spooling assembly is spring biased to cause the leash cord to retract in the absence of trigger actuation and the presence of a preset external force. The dual-position switch operates in a first position to lock the trigger in an actuated position and in a second position to enable the moveable trigger to operate freely. The dual-mode switch is positioned to enable a user to actuate it with the same hand that grasps the leash handle and actuates the movable trigger.

11 Claims, 8 Drawing Sheets

U.S. PATENT DOCUMENTS

| | | | |
|---|---|---|---|
| 4,903,638 A | 2/1990 | Lacey | 119/114 |
| 4,944,097 A | 7/1990 | Kang | 33/760 |
| 4,964,370 A | 10/1990 | Peterson | 119/109 |
| D337,866 S | 7/1993 | Wiens | D30/153 |
| 5,377,626 A * | 1/1995 | Kilsby et al. | 119/796 |
| 5,483,926 A * | 1/1996 | Bogdahn | 119/796 |
| 5,497,732 A | 3/1996 | Moffre et al. | 119/784 |
| 5,558,044 A | 9/1996 | Nasser | 119/796 |
| 5,595,143 A | 1/1997 | Alberti | 119/794 |
| 5,676,093 A | 10/1997 | Sporn | 119/792 |
| 5,724,921 A | 3/1998 | Bell | 119/795 |
| 5,762,029 A | 6/1998 | DuBois et al. | 119/796 |
| 5,887,550 A * | 3/1999 | Levine et al. | 119/796 |
| 5,890,456 A | 4/1999 | Tancrede | 119/794 |
| 6,003,472 A * | 12/1999 | Matt et al. | 119/796 |
| 6,024,054 A * | 2/2000 | Matt et al. | 119/796 |

* cited by examiner

RETRACTABLE LEASH ASSEMBLY

TECHNICAL FIELD

The invention relates generally to retractable leash handle assemblies. More particularly, one embodiment of the invention is directed to a leash handle assembly having an integrated spool assembly rotatably mounted in a housing. The housing includes an ergonomically designed grip. The leash handle assembly also includes a trigger adapted for intermittently inhibiting the spool assembly from rotating, and a dual-position switch adapted for locking the trigger in an actuated position.

BACKGROUND OF THE INVENTION

A driving motivation in the field of retractable pet leashes is the ability to enable a person having a pet tethered to a leash cord to fluidly adapt to changing spatial relationships between the person and the pet. A housing typically encloses a mechanism for automatically retracting the leash into the housing. Retractable leash assemblies generally operate in two modes. A first mode provides a spring loaded tension on a retractable leash cord. The spring-loaded tension causes the leash cord to retract as slack develops, extend as the owner allows the pet to roam at a further distance, and stops the leash from dragging on the ground. A second locking mode removes the spring-loaded tension and stops the leash from either retracting or extending.

One disadvantage of traditional retractable pet leash assemblies is that the switching mechanism for selecting between a spring-loaded tension mode and a locked mode of operation is somewhat clumsy to operate. Some prior systems require a constant force to be applied to a braking mechanism to maintain the leash in a locked mode. Such a mechanism may cause the owner to develop hand fatigue. In other conventional retractable pet leash assemblies, the locked mode is maintained by applying a locking pin to the brake mechanism. Quite often such leashes require the use of both hands, or require difficult single-handed motions to transit between the locked and spring-loaded tension modes of operation.

Accordingly, an object of the present invention is to provide a more ergonomic retractable pet leash assembly that easily transits between a locked mode of operation and a spring loaded tension mode of operation.

This and other objects will be apparent with the following description of the invention.

SUMMARY OF THE INVENTION

The invention remedies deficiencies in conventional leash handle assemblies by providing in one embodiment a leash handle assembly having a housing with an ergonomically designed grip portion, a spool assembly, a trigger assembly and a dual-position switch. The grip portion is adapted for enabling a user to grasp the leash handle assembly. The grip portion may be fabricated with the housing as a single unit, or alternatively the grip portion and the housing may be fabricated as separate units and then fastened together. The spool assembly rotatably mounts within the housing and is adapted for attaching to and winding a leash cord.

The trigger is mounted to the grip portion. Actuating the trigger inhibits the spool assembly from rotating. Alternatively, in a response to being in a released position, the trigger enables rotation of the spool assembly. Optionally, the spool assembly is spring biased to retract a leash in response to the trigger being in the released position and an external force on a leash being below a preset spring constant threshold. A feature of the trigger is that it may be operated with a single finger, while leaving the rest of the hand to grasp the grip portion.

The dual-position switch mounts on the housing and operates in a first position to lock the trigger in an actuated position, and in a second position to enable the trigger to freely operate. According to a feature of the invention, the dual-position switch is located proximate to the grip portion, thereby enabling a user to actuate the dual-position switch with the same hand that grasps the leash handle and actuates the trigger.

According to a further embodiment, the spool assembly is adapted retracting a leash cord into the housing assembly and extending a leash cord out of the housing. Additionally, the leash handle assembly further includes a leash cord guide mounted inside of the housing for guiding a leash cord into and out of the housing at an angle that reduces frictional wear on the leash cord.

In another embodiment, the housing assembly has a front-facing surface with an orifice through which a leash cord can pass, and the leash handle assembly includes an anti-wear ring. The anti-wear ring mounts in the orifice to further reduce the frictional wear on a leash cord. According to one embodiment the anti-wear ring is formed from a lubricious material such as, nylon or delrin.

According to another embodiment, the leash handle assembly includes a slack reduction feature. According to this feature, the spool assembly includes a spring biasing mechanism for biasing the spool assembly such that in response to the movable trigger being in a released position, the spool assembly tends to operate to retract a leash cord. The force required to extend a leash cord in this mode of operation is dependent on various factors, including the spring constant of the spring bias mechanism. An advantage of this feature is it tends to prevent extended portions of a leash cord from dragging on the ground.

Another feature of the invention provides mechanisms for reducing harmful stress that an external force on a leash cord, such as that caused by tethered animal, can cause on a user's wrist. One way of reducing the harmful stress is by reducing the tendency of a user's wrist to twist and bend in response to externally exerted forces on a leash cord. Reduced twisting is achieved by the invention by directing the external forces through the leash handle assembly and along an axis which is co-linear with a longitudinal axis of the users forearm.

According to one embodiment, the grip portion describes an arc having a midpoint and a center point. The leash housing assembly includes a front-facing surface having an orifice with a center through which a leash cord passes during retraction and extension, wherein the center of the orifice is positioned along a line that passes proximate to the center point and the midpoint of the arc described by the grip portion. Such an arrangement reduces the tendencies of the leash handle assembly to deflect in a vertical direction in response to the exertion of an external force on a leash cord, and thus reduces stress on a user's wrist.

According to another embodiment, the grip portion has an elongated cross-section characterized by a length and a width, wherein the length is greater than the width, and wherein the length extends along an axis that passes through the spool assembly. Having such an elongated cross-section enables the grip to reduce tendencies of the leash handle assembly to rotate about an axis normal to a plane of the elongated cross-section, and thus further reduces stress on a user's wrist. According to an additional feature of the invention, the grip portion is formed from a hard plastic and includes an elastomeric coating molded over the hard plastic to provide a softer, higher friction grip. The elastomeric coating further reduces the tendency of the leash handle assembly to rotate in a person's hand.

Optionally, the housing assembly includes a bottom surface having one or more protuberances that act as stabilizing feet. The protuberances are adapted to enable the leash handle assembly to be placed in an upright position on a surface.

In further embodiments, the invention provides additional features of a leash handle, along with methods for providing those features and the above discussed features.

BRIEF DESCRIPTION OF THE DRAWINGS

The subject matter regarded as the present invention is particularly pointed out and distinctly claimed in the concluding portion of the specification. The invention, however, both as to organization and methods of practice, together with further objects and advantages thereof, may best be understood by reference to the following illustrative description taken in conjunction with the accompanying drawings in which like numerals refer to like elements, and in which

FIG. 5 is an exploded left perspective view of the leash handle assembly of. FIG. 1;

DESCRIPTION OF ILLUSTRATED EMBODIMENTS

The invention is generally directed to retractable leash handle assemblies. According to one embodiment, the leash handle assembly is adapted for mechanically coupling to a leash cord, and includes components for retracting and extending the leash cord. Those components include, for example, a housing having an ergonomically designed grip portion, a spooling assembly rotatably mounted in the housing, a trigger movably mounted to the grip portion, and a dual-position switch for locking the trigger in an actuated position. Actuating the trigger inhibits the spooling mechanism from rotating. Releasing the trigger enables the spooling mechanism to rotate freely to extend or retract the leash cord. Optionally, the spooling assembly is spring biased to cause the leash cord to retract in response to the trigger being in a released position and in the absence of an external force of a preset value being exerted on a leash cord wound on the spool assembly. The dual-position switch, located proximate to the grip portion, operates in a first locked position to lock the trigger in an actuated position, and in a second unlocked position that enables the trigger to operate freely. The trigger and the dual-position switch are positioned proximate to each other so that the same hand can grasp the grip, actuate the trigger with one finger, and operate the dual-position switch. This combination is superior to prior approaches because a user's hand naturally tends to actuate the trigger and limit leash extension in response to an animal abruptly tugging the leash. Additionally, hand fatigue associated with maintaining the trigger in the actuated position is reduced by placing the dual-position switch in the locked position while the trigger is actuated. Also, the location of the dual-position switch enables easy operation with the thumb finger of the grasping hand, thereby leaving the user's other hand completely free. These and other features of the invention are discussed in further detail below.

Figure 1:
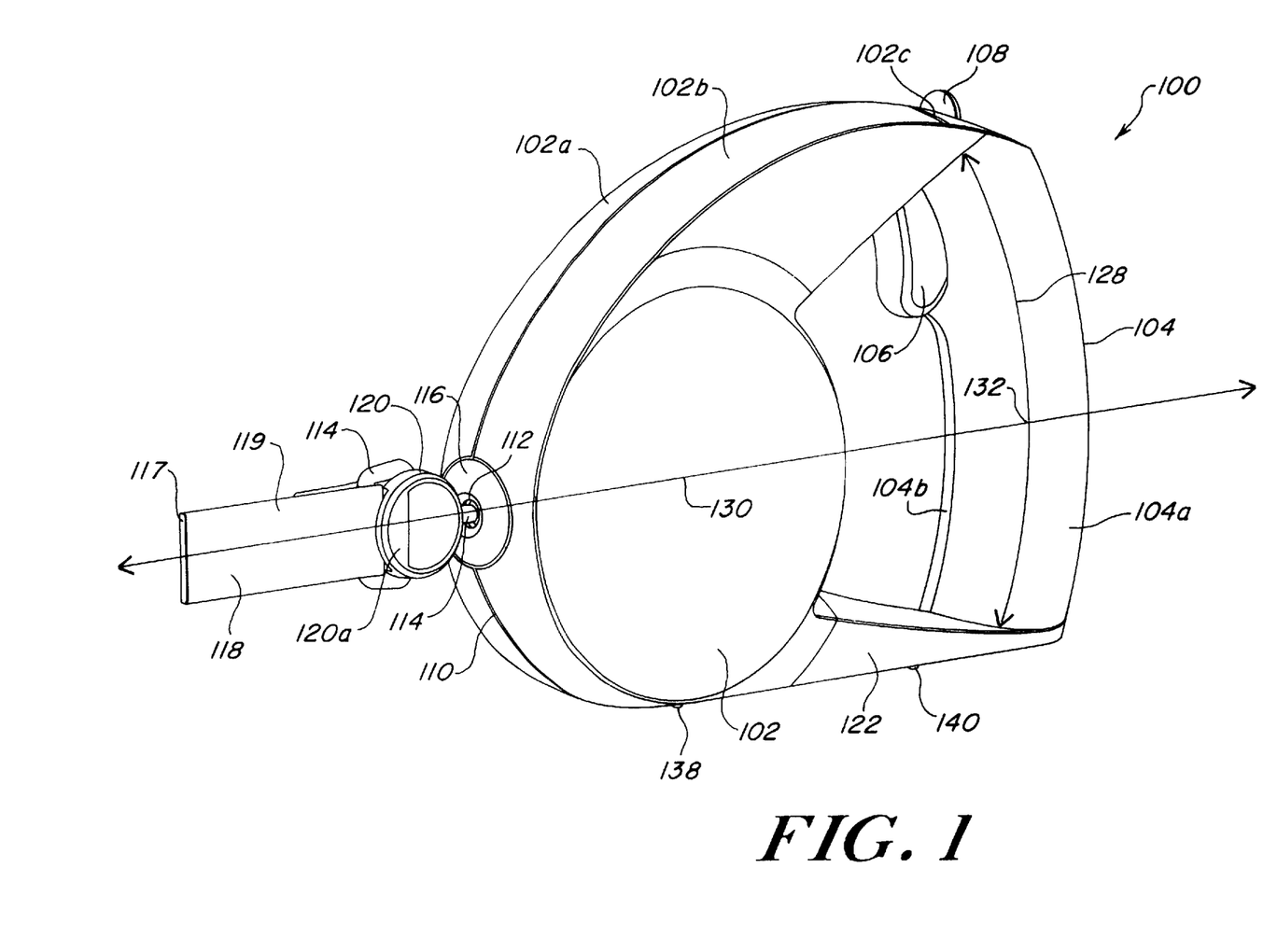
FIG. 1 is a right perspective front view of a leash handle assembly according to an illustrative embodiment of the invention.

FIG. 1 is a right frontal perspective view of a leash handle assembly 100 according to an illustrative embodiment of the invention. As shown, the leash handle assembly 100 includes a housing 102. The housing 102 has a grip portion 104. The grip portion 104 may be integrally fabricated with the housing 102, or in alternative embodiments be fabricated separately from the housing 102 and subsequently fastened to the housing 102. FIG. 1 illustratively depicts an embodiment wherein the grip portion 104 is integrally fabricated with the housing 102, and the housing 102 is fabricated in two halves 102a and 102b. The half 102a includes a grip portion half 104a, and the housing half 102b includes a grip portion half 104b.

The leash handle assembly 100 also includes a trigger 106, adapted for movable mounting to a radially inner section of the grip portion 104, proximate to an upper most portion of the housing 102. The location of the trigger 106 enables a user to actuate the trigger 106 with an index finger, which using the remaining fingers of the grasping hand to hold onto the grip portion 104. Actuating the trigger 106 inhibits the leash cord 114 from extending from or retracting into the housing 102. The leash handle assembly 100 further includes a dual-position switch 108 adapted for movable mounting to an upwardly facing surface 102c of the housing 102. As discussed in further detail below, the dual-position switch 108 operates in a first position to lock the trigger 106 in an actuated position, and operates in a second position to enable the trigger 106 to operate freely.

A forward facing portion 110 of the housing assembly 102 has an orifice 112 with a center portion through which the leash cord 114 passes. The leash handle assembly 100 also includes an anti-wear ring 116 mounted in the orifice 112. The anti-wear ring 116 buffers the leash cord 114 through the orifice 112 to reduce the frictional wear on the leash 114 due to the leash 114 rubbing against the portion of the housing 102 defining the orifice 112. The anti-wear ring 116 also inhibits the leash cord 114 from forcing the housing halves 102a and 102b apart during extension and retraction of the leash cord 114. According to an illustrative embodiment, the anti-wear ring 116 is fabricated as a unitary structure and formed from a lubricious material, such as nylon or delrin.

Another feature of the illustrative housing 102 is a base portion 122. Optionally, a bottom surface (shown at 136 in FIG. 4) of the base portion 122 includes protuberances 138 and 140. The protuberances 138 and 140 operate as stabilizer feet upon which the leash handle assembly 100 can stand. The protuberances 138 and 140 enable the leash handle assembly 100 to be stored in an upright position on a relatively flat surface.

Figure 5:
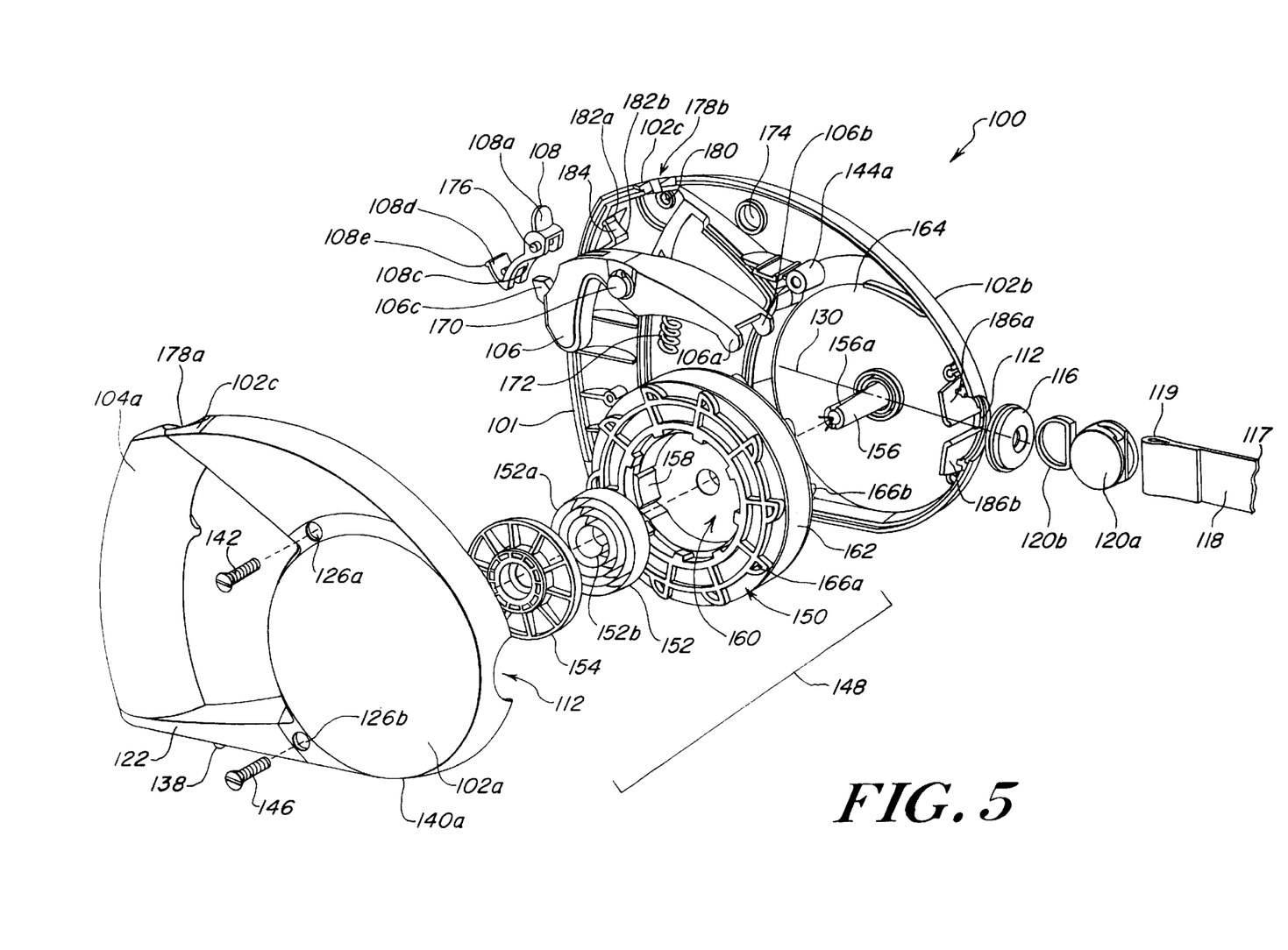

The leash cord 114 is adapted for connecting to an animal collar by way of a transitional link connector 120 and a nylon webbing strip 118. Referring to FIG. 5, transitional link connector 120 includes a cord stop portion 120a and a cord stop cover 120b. The leash cord 114 threads through the cord stop portion 120a and through a sewn loop 119 in the webbing 118. The leash cord 114 then reenters the cord stop portion 120a and is knotted in place. The cord stop cover 120b then snaps onto the cord stop portion 120a. The end 117 of the webbing strip 118 threads through and attaches to a metal snap (not shown). The metal snap is adapted for clipping to an animal's collar. At times, tethered animals turn their heads around and attempt to chew through the leash cord 114. However, the nylon webbing strip 118 is stronger than the leash cord 114 and provides an essentially "chew proof" buffer between the leash cord 114 and a tethered animal. In addition to providing an interface between the leash cord 114 and the nylon webbing strip 118, the transitional link connector 120 acts as a stop for the leash cord 114. Without the connector 120, the leash cord 114 would fully retract through the orifice 112 and into the housing 102. Connectors, such as the transitional link connector 120, can vary in design and are well known to skilled practitioners.

As discussed above, in operation, actuating the trigger 106 inhibits the leash cord 112 from extending out of or retracting into the housing 102. Releasing the trigger 106 enables the leash cord 114 to pass freely through the orifice 112 and the anti-wear ring 116. Placing the dual-position switch 108 in a first locked position while the trigger 106 is actuated locks the trigger 106 in an actuated position. Alternatively, placing the dual-position switch 108 in a second unlocked position enables the trigger 106 to operate freely. If the trigger 106 is in a released position, the dual-position switch 108 is inhibited from being moved into the first locked position. As discussed in further detail below with respect to FIG. 5, according to the illustrative embodiment 100, when the trigger 106 is in a released position, the leash cord 114 is subject to a spring bias that tends to retract the leash cord 114 into the housing 102. This spring bias reduces slack in an extended portion of the leash cord 114, which may result from changes in the spatial relationship between a person and an animal tethered to the leash cord 114.

Figure 2:
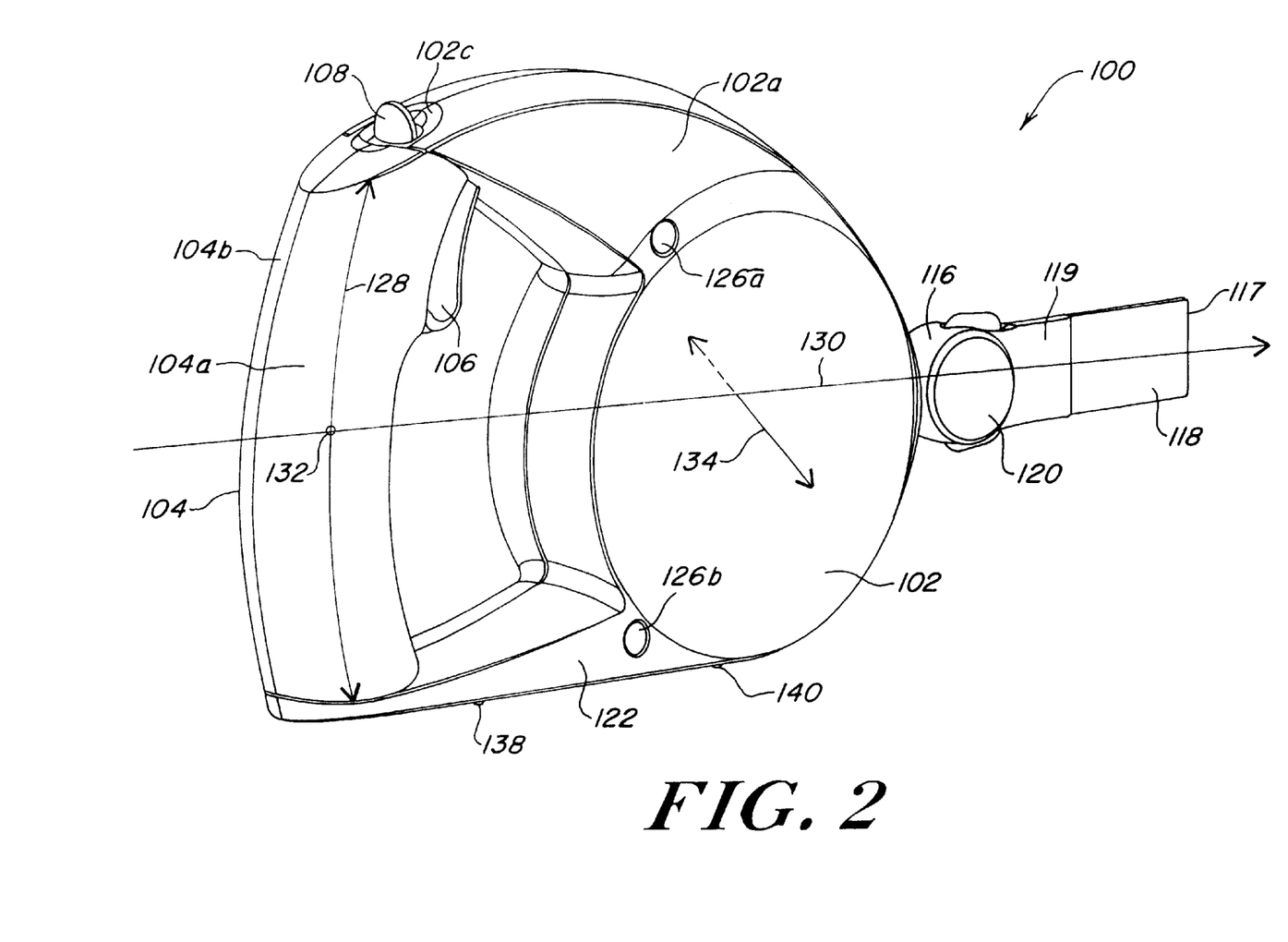
FIG. 2 is a left perspective front view of the illustrative leash handle assembly of FIG. 1.

FIG. 2 is a left frontal perspective view of the illustrative leash handle assembly 100 of FIG. 1. The view of FIG. 2 more clearly depicts the housing half 102a, along with the grip portion half 104a. FIG. 2 also shows the mounting holes 126a and 126b through which screws extend to fasten the housing half 104a with the housing half 104b.

As shown in both FIGS. 1 and 2, the grip portion 104 describes an arc 128. According to an ergonomic feature of the illustrative embodiment, the leash cord 114 is directed by leash guide ribs (shown at 186a and 186b in FIG. 5) inside of the housing 102 to pass through the orifice 112 along a line 130. The leash guide ribs 186a and 186b are discussed in further detail below with respect to FIG. 5. The line 130 substantially bisects the arc 128. By designing the midpoint 132 of the arced grip assembly 104 to be substantially co-linear with the center of the orifice 112, and by internally directing the leash cord 114 to pass through the orifice 112 along the line 130, the illustrative embodiment reduces the tendency of the leash handle assembly 100 to rotate about an axis 134 in response to externally exerted forces, such as those applied to a leash by tugging animals.

The axis 134 is substantially normal to the line 130 and to a plain defined by the surface 133 of the housing 102. By reducing the tendency of the leash handle assembly 100 to rotate about the axis 134, the illustrative embodiment causes substantial portions of externally exerted forces on the leash cord 114 to be directed along the line 130. Additionally, due to the arced feature of the grip 104, the line 130 tends to extend along the forearm of a person grasping the grip 104. Thus, by reducing the tendency of the leash handle assembly 100 to rotate about the axis 134, the illustrative embodiment 100 directs substantial portions of the externally exerted forces along a person's forearm, and reduces the tendency of a user to uncomfortably twist his or her wrist.

Figure 3A:
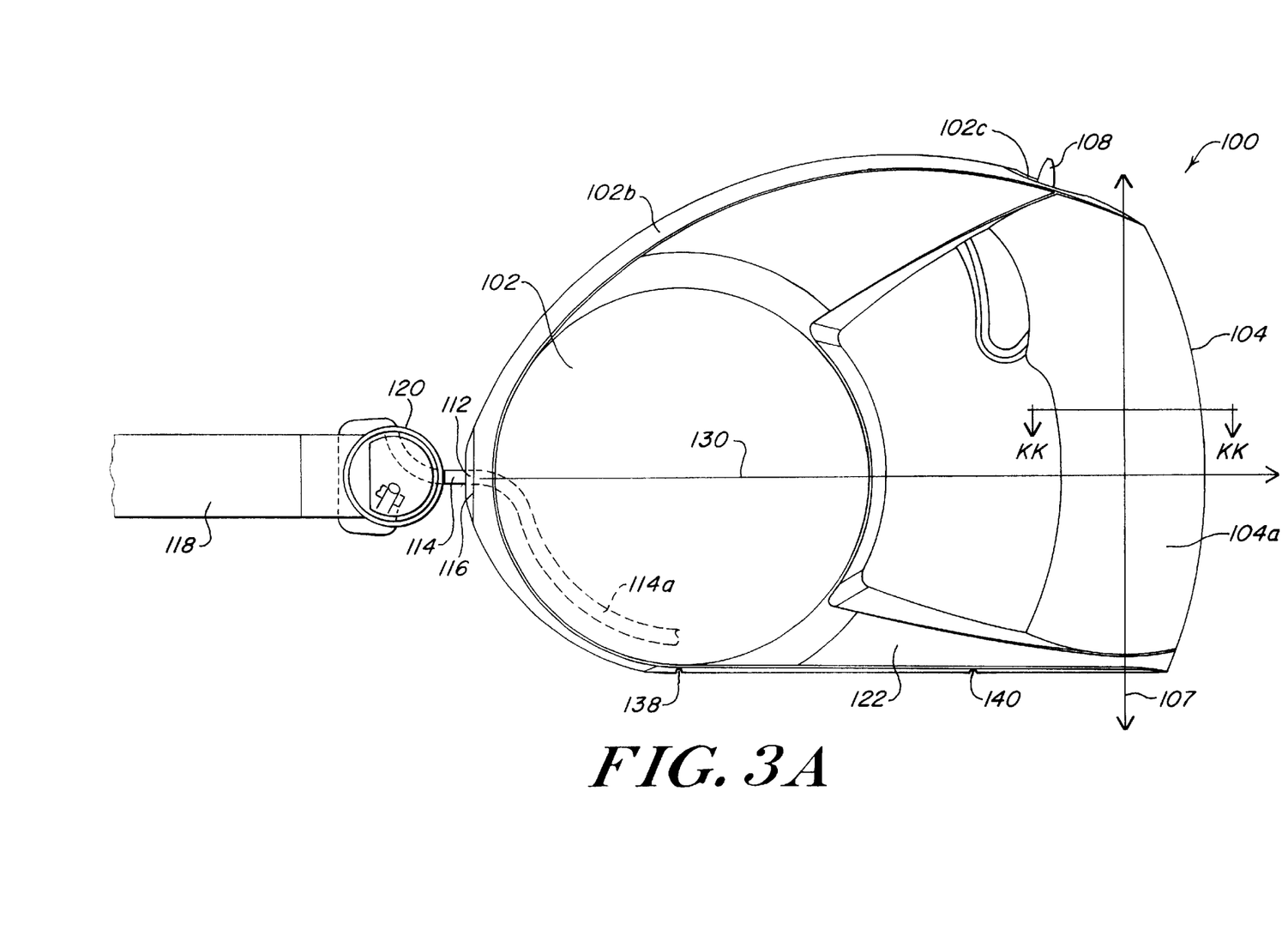
FIG. 3A is a right side view of the illustrative leash handle assembly of FIG. 1.

FIG. 3A is a right side view of the leash handle assembly 100 of FIGS. 1 and 2. FIG. 3 more particularly points out the path followed by the leash cord 114 along the line 130. As described above and as illustrated in FIG. 3, the leash cord 114 couples to an animal collar by way of the transitional link connector 120 and the nylon strip 118. The leash cord 114 is then directed through the orifice 112 and the anti-wear ring 116 along the line 130. Subsequent to entering the housing 102, the leash cord 114 is directed along a path 114a by the leash guide ribs 186a and 186b to a spool assembly 148, all of which is shown in FIG. 5. The spool assembly 148 and the leash guide ribs 186a and 186b are discussed in further detail below.

Figure 3B:
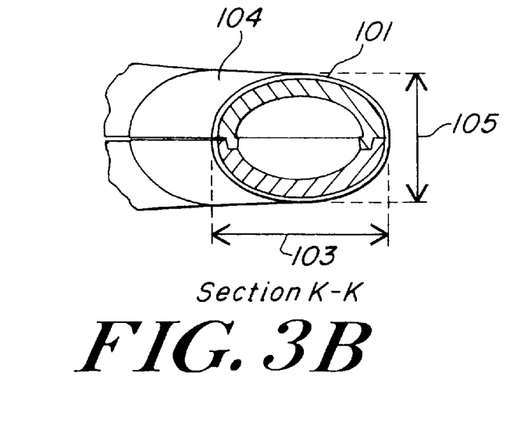
FIG. 3B is a cross-sectional view of the grip of FIG. 3.

FIG. 3B is cross-sectional view of the grip portion 104. As illustrated in FIG. 3B, the cross-section KK of the grip portion 104 is elliptical in nature. More specifically, the cross-section KK has a major diameter 103 and a minor diameter 105. The major diameter 103 is larger than minor diameter 105. Additionally, the major diameter 103 extends substantially in the direction of the orifice 112 through which the leash cord 114 extends and retracts. With the grip portion 104 being elongated in the direction of the orifice 112, the grip portion 104 reduces the tendency of the leash handle assembly 100 to twist in a user's hand.

A further feature of the invention illustrated in FIG. 3B is the optional elastomeric coating 101 on the grip portion 104. According to the illustrative embodiment, the grip portion 104 is formed from a hard plastic, and the coating 101 is a thermoplastic elastomer molded over the hard plastic. The thermoplastic elastomer can be for example, santoprene, krayton, pebax or other like materials. In the illustrative embodiment, the coating is approximately one sixteenth of an inch thick. However, other thicknesses may be employed. The elastomeric coating further reduces the tendency of the leash handle assembly 100 to twist in a user's hand.

Figure 4:
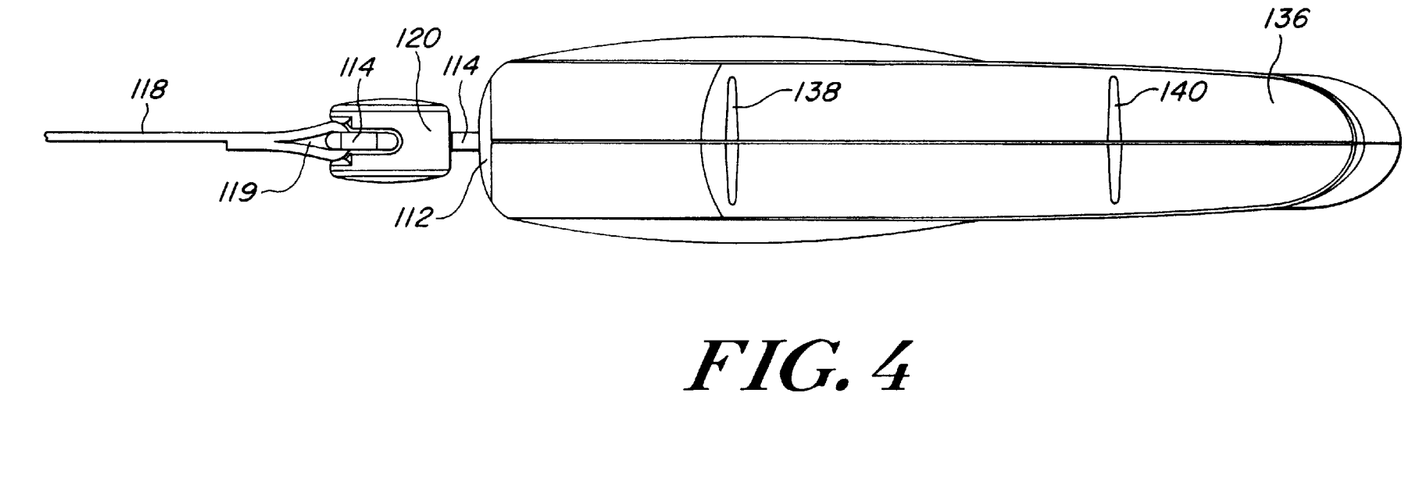
FIG. 4 is a top view of the illustrative leash handle assembly of FIG. 1.

FIG. 4 depicts a bottom view of the leash handle 100. As shown, the illustrative leash handle assembly 100 includes a bottom surface 136. The bottom surface 136 includes two protuberances 138 and 140, which operate as stabilizing feet. The protuberances 138 and 140 are capable of supporting the leash handle assembly 100 on a substantially flat surface, thus enabling the leash handle assembly 100 to be stored in an upright position.

Also shown in FIG. 4 is a bottom view of the interface connector 120. As can be seen, the leash cord 114 passes through the loop 119 and fastens inside the connector 120.

FIG. 5 is an exploded left perspective view of the leash handle assembly 100. The view of FIG. 5 once again shows the housing halves 102a and 102b, optionally including the elastomeric coating 101. The housing assembly half 102a includes the grip half 104a. The housing half 102a also includes portions 138a and 140a of the stabilizer feet 138 and 140, respectively. Also shown are the mounting holes 126a and 126b. During assembly, the mounting screw 142 extends through the mounting hole 126a to engage the screw boss 144a. Similarly, the mounting screw 146 extends through the mounting hole 126b and engages the screw boss 144b (shown in FIG. 6A). In this way, the housing halves 102a and 102b are secured together.

FIG. 5 also shows a spool assembly 148 that is adapted for winding the leash cord 114. The spool assembly 148 includes a rotatable reel 150, a power spring 152 and a reel cover 154. A stationary axle 156 extends from the housing half 102b. A radially outer end 152a of the power spring 152 attaches to a retention element 158 in the rotatable reel 150 to fasten the power spring 152 in the rotatable reel cavity 160. The rotatable reel 150 and the attached power spring 152 fit onto the axle 156. When mounted on the axle 156, a radially inner end 152b of the power spring 152 fits into the slot 156a of the axle 156. In this way, the power spring 152 is fastened at the radially outer end 152a to the rotatable reel 150, and at the radially inner end 152b to the stationary axle 156. The reel cover 154 fastens over the power spring 152 to secure the power spring 152 in the rotatable reel cavity 160. The power spring 152 is initially coiled to spring bias the spool assembly 148 to retract the leash cord 114. Additionally, as the rotatable reel 150 rotates to extend the leash cord 114 out of the leash handle assembly 100, the power spring 152 coils further, thereby providing additional retracting bias as the extended portion of the leash cord 114 increases.

The outer surface 162 of the rotatable reel 150 is adapted for spooling a leash cord, such as the leash cord 114. With the spool assembly 148 mounted on the stationary axle 156, and with the two housing halves 102a and 102b fastened together, the inner surface 164 of the housing half 102b supports the leash cord 114 as it winds around the surface 162. A similar inner surface (not shown) of the housing half 102b also supports the leash cord 114 as it winds around the surface 162.

Referring to FIGS. 3–5, the leash cord 114 wound on the rotatable reel 150 extends through the orifice 112 and the anti-wear ring 116 and attaches to the interface connector 120. As discussed above, the anti-wear ring 116 is formed from a lubricious material and reduces frictional wear on the leash cord 114, which can result from the leash cord 114 rubbing against the housing assembly 102. The anti-wear ring 116 also inhibits the leash cord 114 from causing the housing halves 102a and 102b to separate. The leash handle assembly 100 further includes the leash guide ribs 186a and 186b. The leash guide ribs 186a and 186b direct the leash cord 114 to extend from and retract into the reel 162 along the line 130. As shown, the line 130 provides a diameter through the reel assembly 148, and as discussed above, by directing the leash cord 114 along the diameter line 130, external forces placed on the leash cord 114 are more directly transferred to a user's forearm rather a user's wrist.

The rotatable reel 150 includes teeth 166a spaced evenly around the circumference of an outer facing portion of the reel 150 and teeth 166b spaced evenly around the circumference of an inner facing portion of the real 150. According to the illustrative embodiment, the reel 150 includes ten teeth 166a and ten teeth 166b. Each of the teeth 166a align with a corresponding tooth 166b. The teeth 166a are adapted for engaging a first rotation inhibitor portion 106a of the trigger 106. The teeth 166b are adapted for engaging a second rotation inhibitor portion 106b of the trigger 106. The trigger 106 rotatably mounts on a the rotation axle post 170. When assembled, a post receptor 174 in the housing half 102b supports the axle post 170. A similar post receptor (not shown) located on the inner surface of the housing half 102a also supports the rotation axle post.

In operation, a user actuates the trigger 106 by squeezing it, preferably with one finger. As the trigger 106 is actuated, it rotates in a clockwise direction about the trigger rotation axle post 170. The clockwise rotation causes the first rotation inhibitor portion 106a to engage one of the teeth 166a and causes the second rotation inhibitor portion 106b to engage a corresponding tooth 166b. With the rotation inhibitor portions 106a and 106b engaged, the reel 150 is inhibited from extending or retracting the leash cord 114. Upon release of the trigger 106, a compression spring 172 forces the trigger to rotate in a counter clockwise direction about the rotation axle post 170, thus disengaging the rotation inhibitor portions 106a and 106b from the teeth 166a and 166b, respectively. In the released position, the spool assembly 148 is able to rotate freely to extend or retract the leash cord 114. However, as previously mentioned, the bias provided by the power spring 152b, in the absence of a sufficient external force on the leash, tends to cause the leash cord 114 to retract.

The leash handle assembly 100 includes a dual-position switch 108. When assembled, a switch rotation post 176 passes through the dual-position switch 108 and rotatably mounts in the post receptor 180. The housing half 102a includes a similar post receptor (not shown) for supporting the switch rotation post 176. When mounted, a locking lever 108a extends through the cutout 178a in the housing half 102a and the cutout 178b in the housing assembly half 102b. The dual-position switch 108 also includes a locking slot 108c, through which a trigger locking tab 106c passes when the dual-position switch 108 is in an unlocked state. The locking slot 108c engages the trigger locking tab 106c when the trigger 146 is actuated and the dual-position switch 108 is moved into a locked state. As shown, the trigger locking tab 106c includes a tapered upper portion for enabling the trigger locking tab 106c to pass through the locking slot 108c when the dual-position switch is in an unlocked state. A radially extending tab 108d on the dual-position switch 108 includes a nub 108e for engaging the detents 182a and 182b of the tab 184 for securing the dual-position switch 108 in either a locked or an unlocked position. The interoperation of the trigger 106 and the dual-position switch 108 is discussed in further detail below, with respect to FIGS. 6A through 8B.

Figures 6A, 6B:
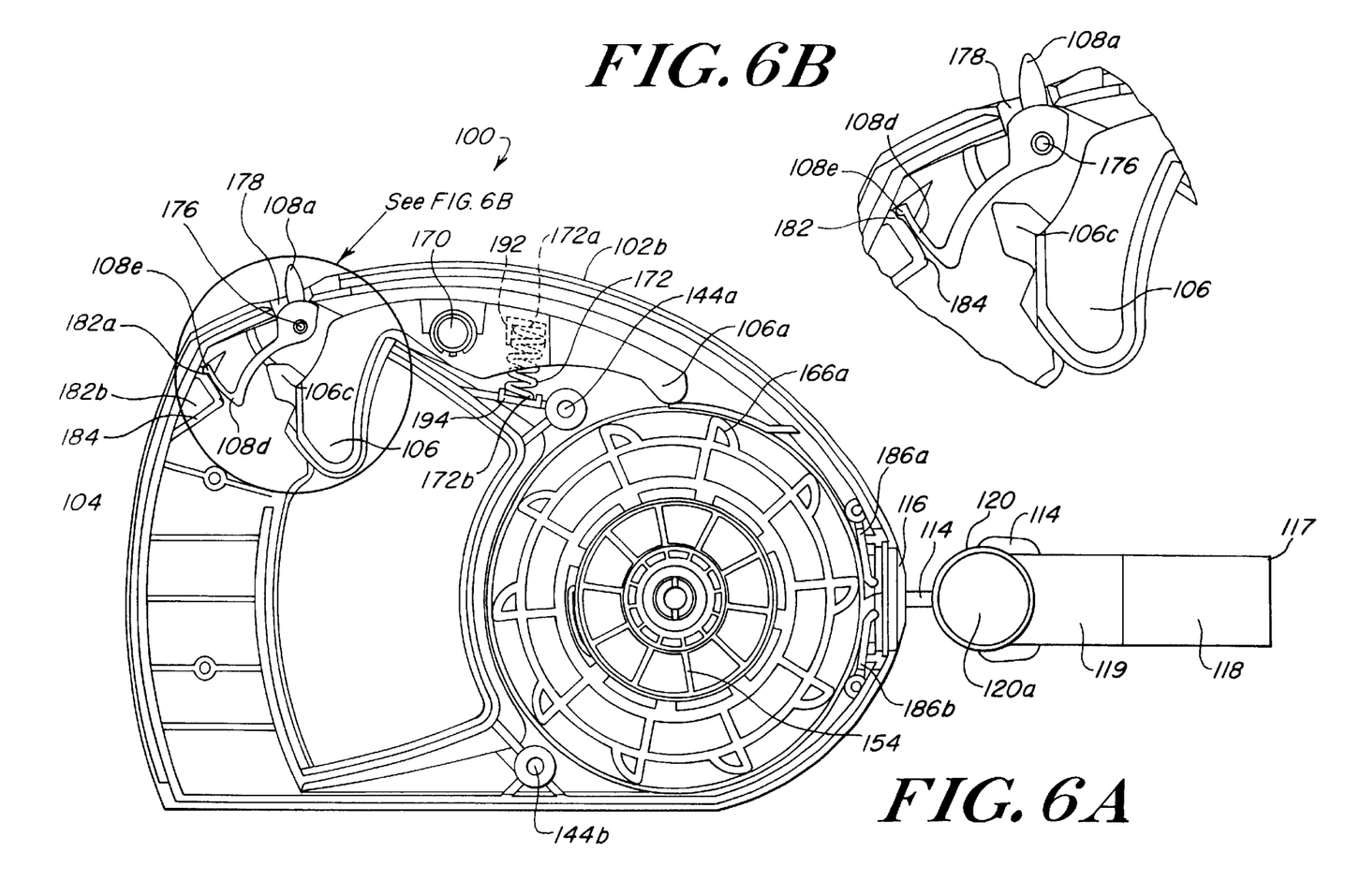
FIG. 6A is right side cross-sectional view, of the leash handle assembly of FIG. 1 depicted with a trigger in a released position and a dual-position switch in an unlocked position.
FIG. 6B is an enlarged view of the dual-position switch and trigger of FIG. 6A depicted as positioned in FIG. 6A.

FIG. 6A is right side cross-sectional view of the leash handle assembly 100 depicted with the trigger 106 in a released position and the dual-position switch 108 in an unlocked state. FIG. 6B is an enlarged view of the trigger 106 and the dual-position switch 108 of FIG. 6A. Referring to FIGS. 6A and 6B, with the dual-position switch 108 in the unlocked state, the locking lever 108a is rotated about the post 176 into a forward position. The nub 108e on the tab 108d interfits with the unlock detent 182a of the tab 184 to secure the dual-position switch 108 in the unlocked state. A shown in FIG. 6A, the trigger 106 includes a compression spring upper seat 192 and the housing assembly half 102b includes a compression spring lower seat 194. An upper portion 172a of the compression spring 172 fits into the upper seat 192, and a lower portion 172b fits into the lower seat 194. As mentioned above, with the trigger 106 in the released position, the compression spring 172 forces the trigger to rotate in a counter clockwise direction about the rotation axle post 170, thus disengaging the rotation inhibitor portions 106a and 106b from the teeth 166a and 166b, respectively. Also, with the trigger 106 in the released position, the trigger locking tab 106c does not align with the locking slot 108c, thereby inhibiting the dual-position switch 108 from being actuated into a locked state, while the trigger is in a released position.

Figures 7A, 7B:
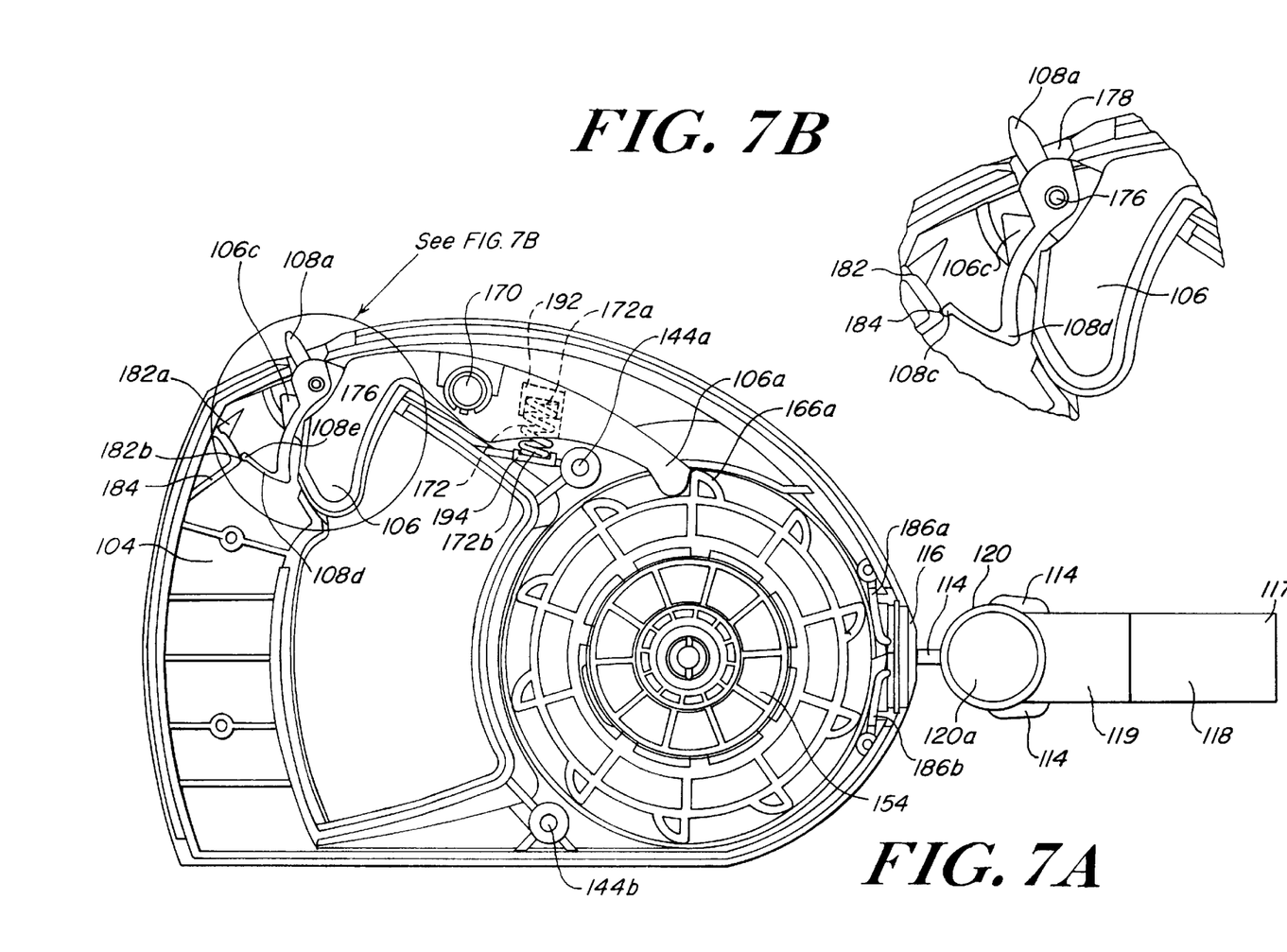
FIG. 7A is a right side cross-sectional view of the leash handle assembly of FIG. 1 depicted with the trigger in an actuated position and the dual-position switch in a locked position.
FIG. 7B is an enlarged view of the dual-position switch and trigger of FIG. 7A depicted as positioned in FIG. 7A.

FIG. 7A is a right side cross-sectional view of the leash handle 100 depicted with the trigger 106 in an actuated position and the dual-position switch 108 in a locked state. FIG. 7B is an enlarged view of the of the trigger 106 and the dual-position switch 108 as positioned in FIG. 7A. In the actuated position, the trigger 106 rotates in a clockwise direction about the rotation axle post 170, thus compressing the spring 172 between the upper seat 192, and the lower seat 194. Additionally, the rotation inhibitor portions 106a and 106b engage the reel locking teeth 166a to inhibit the spool assembly 148 from extending or retracting the leash cord 114. Referring also to FIG. 5, with the trigger 106 actuated, the dual-position switch 108 may be moved into a locked state. To achieve the locked state, the trigger 108 is rotated in a counter clockwise direction about the post 176 so that the trigger locking tab 106c engages the locking slot 108c in the dual-position trigger 108. Additionally, the nub 108e of the radially extending tab 108d engages the lock detent 182b of the support 184. In this way, the dual-position switch 108 locks the trigger 106 in an actuated position. To unlock the trigger 106, a user moves the locking lever 108a in the forward direction, thus rotating the dual-position switch 108 in a clockwise direction about the post 176 and disengaging the trigger locking tab 106c from the locking slot 108c.

Figures 8A, 8B:
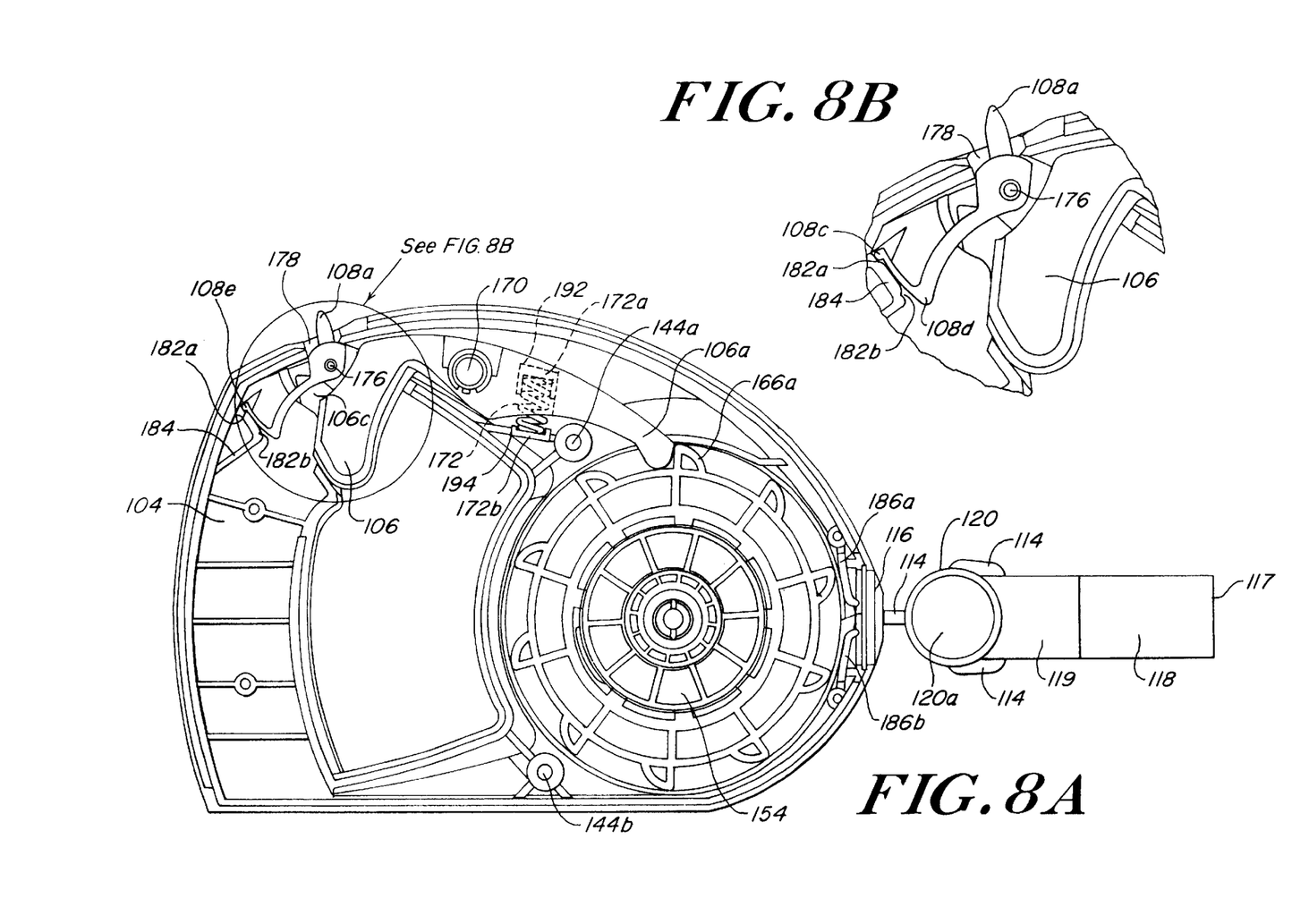
FIG. 8A is a right side cross-sectional view of the leash handle of FIG. 1 depicted with the trigger in an actuated position and the dual-position switch in an unlocked position.
FIG. 8B is an enlarged view of the dual-position switch and trigger of FIG. 8A depicted as positioned in FIG. 8A.

FIG. 8A is a right side cross-sectional view of the leash handle 100 depicted with the trigger 106 in an actuated position and the dual-position switch 108 in an unlocked state. FIG. 8B is an enlarged view of the dual-position switch 108 and the trigger 106, as positioned in FIG. 8A. With the dual-position switch 108 in an unlocked state, the locking lever 108a is in a forward position and the nub 108e engages the detent 182a. Additionally, due to the tapered upper portion of the trigger locking tab 106c, the trigger locking tab 106c can pass freely through the locking slot 108c, thus enabling the trigger 106 to be freely actuated. As in the case of FIG. 7A, the rotation inhibitor portions 106a and 106b engage the reel locking teeth 166a and 166b to inhibit the spool assembly 148 from extending or retracting the leash cord 114. Releasing the trigger 106 enables the compression spring 172 to decompress and rotate the trigger 106 in a counter clockwise direction, thus disengaging the inhibitor portions 106a and 106b from the reel locking teeth 166a and 166b, and once again allowing the spool assembly 148 to extend and retract the leash cord 114 freely.

Thus, the invention provides a leash handle assembly with a plurality of improvements over conventional leash handle assembly designs. By way of example, the illustrative leash handle assembly 100 provides an ergonomic grip that reduces the tendencies for the leash handle to twist laterally in a user's hand. The illustrative ergonomic grip 104 also operates in alignment with the spool assembly 148 and the leash guide ribs 186a and 186b to direct forces along a user's forearm, rather than putting undue stress on a user's writ. The illustrative embodiment also provides an easy to use trigger 106 for intermittently locking the leash cord 114 at a particular extension, along with a dual-position locking switch 108 for locking the trigger 106 in an actuated position to reduce hand fatigue. Additionally, the dual-position switch 108 is ergonomically positioned so that it can be operated by the same hand that grasps the leash handle grip 104. The leash handle assembly 100 further provides an anti-wear ring 116 for reducing the frictional wear and extending the life of the leash cord 114. The anti-wear ring 116 also reduces the tendency of the housing halves 102a and 102b of the leash handle assembly 100 to separate. Another feature of the illustrative leash handle assembly 100 is the support feet 138 and 140 on the bottom surface 136 of the housing 102. The support feet 138 and 140 enable the leash handle assembly 100 to be stored in an upright position on a relatively flat surface. It will thus be seen that the invention efficiently attains the objects set forth above.

Since certain changes may be made in the above constructions and the described methods without departing from the scope of the invention, it is intended that all matter contained in the above description or shown in the accompanying drawings be interpreted as illustrative and not in a limiting sense.

Having described the invention, what is claimed as new and protected by Letters Patent is:

1. A leash handle assembly comprising,
    a housing having a grip portion for enabling a user to grasp said leash handle assembly,
    a spool assembly rotatably mounted inside of said housing and adapted for selectively winding a leash card,
    a trigger movably mounted on a radially inner section of said grip portion, wherein said trigger is adapted for inhibiting rotation of said spool assembly in response to actuation of said trigger, and for enabling rotation of said spool assembly response to release of said trigger, and
    a dual-position switch movably mounted on said housing proximal to said grip portion, wherein said dual-position switch is adapted for operating in a first locked position to lock said trigger in an actuated position, and for operating in a second unlocked position for enabling free operation of said trigger.

2. A leash handle assembly according to claim 1, wherein said dual-position switch is further adapted to be inhibited from being moved into said first locked position when said trigger is in said released position.

3. A leash handle assembly according to claim 1, wherein said dual-position switch is mounted at a location such that it can be actuated with a finger of a hand embracing said grip portion and operating said movable trigger.

4. A leash handle assembly according to claim 1, wherein said spool assembly is adapted for retracting said leash cord into said housing, and extending said leash out of said housing, and said leash handle assembly further includes leash guide means mounted inside of said housing for guiding said leash cord into and out of said housing along a diameter of said spool assembly, thereby tending to transfer external forces applied to said leash cord along a user's forearm, and reducing wrist fatigue.

5. A leash handle assembly according to claim 1, wherein said housing has a front-facing surface, said front-facing surface includes an orifice through which said leash cord passes, and said leash hand assembly further includes an anti-wear ring mounted in said orifice, wherein said anti-wear ring is adapted for passing said leash cord through said orifice and for reducing frictional wear on said leash cord.

6. A leash handle assembly according to claim 5 wherein said anti-wear ring is formed from a lubricious material.

7. A leash handle assembly according to claim 1 wherein said spool assembly includes a spring bias mechanism adapted to biased said spool assembly such that in response to said trigger being in a released position, said spool assembly tends to operate to retract said leash cord, thus reducing slack in an extended portion of said leash cord.

8. A leash handle assembly according to claim 1 further comprising a bottom surface, wherein said bottom surface includes a one or more stabilizing protuberances adapted for supporting said leash handle assembly on a surface in an upright position.

9. A leash handle assembly according to claim 1, wherein said grip portion describes an arc having a midpoint and a center, said housing has a front-facing surface including an orifice through which said leash cord passes positioned along a line that passes proximate to said center and said midpoint of said arc, and said positioning of said orifice reduces tendencies of said leash handle to deflect in a vertical direction in response to an external force exerted by an animal tethered to said leash cord.

10. A leash handle assembly according to claim 1 wherein said grip portion has an elongated cross-section having a length and a width, wherein said length is greater than said width and said length extends along an axis that passes through said spool assembly, wherein having said elongated cross-section enables said grip portion to reduce tendencies of said leash handle assembly to twist in a user's hand.

11. A leash handle assembly according to claim 1 wherein at least a section of said grip portion further includes an elastomeric coating.

* * * * *